United States Patent
Yoo et al.

(10) Patent No.: US 12,413,381 B2
(45) Date of Patent: Sep. 9, 2025

(54) WIRELESS COMMUNICATION SYSTEM

(71) Applicant: LG INNOTEK CO., LTD., Seoul (KR)

(72) Inventors: Chang Hoon Yoo, Seoul (KR); Sung Jun Bae, Seoul (KR); Jeong Hyeon Son, Seoul (KR); Seung Taek Woo, Seoul (KR); So Yeon Ham, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 113 days.

(21) Appl. No.: 18/264,683

(22) PCT Filed: Feb. 10, 2022

(86) PCT No.: PCT/KR2022/002058
§ 371 (c)(1),
(2) Date: Aug. 8, 2023

(87) PCT Pub. No.: WO2022/173252
PCT Pub. Date: Aug. 18, 2022

(65) Prior Publication Data
US 2024/0113852 A1 Apr. 4, 2024

(30) Foreign Application Priority Data
Feb. 10, 2021 (KR) .................. 10-2021-0019232

(51) Int. Cl.
*H04L 7/00* (2006.01)
*H04B 17/318* (2015.01)
(Continued)

(52) U.S. Cl.
CPC ......... *H04L 7/0012* (2013.01); *H04B 17/328* (2023.05); *H04W 12/06* (2013.01); *H04W 84/20* (2013.01)

(58) Field of Classification Search
CPC .... H04L 7/0012; H04B 17/328; H04W 12/06; H04W 84/20; H04W 12/009;
(Continued)

(56) References Cited

U.S. PATENT DOCUMENTS 7,357,719 B2 * 4/2008 Yamato .................. A63F 13/45
463/43
8,117,481 B2 * 2/2012 Anselmi .................. G06F 1/14
713/400
(Continued)

FOREIGN PATENT DOCUMENTS

| KR | 10-2015-0116066 A | 10/2015 |
| KR | 10-2015-0135717 A | 12/2015 |

(Continued)

OTHER PUBLICATIONS

International Search Report dated May 10, 2022 in International Application No. PCT/KR2022/002058.
(Continued)

*Primary Examiner* — Faisal M Zaman
(74) *Attorney, Agent, or Firm* — Saliwanchik, Lloyd & Eisenschenk

(57) ABSTRACT

A wireless communication system, according to one embodiment of the present invention, comprises: a first communication module; and at least one second communication module wirelessly connected to the first communication module, wherein the first communication module is wirelessly connected to the second communication module to which driving power is applied from the same power source as that of the first communication module.

16 Claims, 11 Drawing Sheets

(51) Int. Cl.
*H04W 12/06* (2021.01)
*H04W 84/20* (2009.01)

(58) Field of Classification Search
CPC ..... H04W 12/50; H04W 12/63; H04W 84/22; H04W 12/00; H04W 24/04
See application file for complete search history.

(56) References Cited

U.S. PATENT DOCUMENTS

| | | | | |
|---|---|---|---|---|
| 2002/0061748 | A1* | 5/2002 | Nakakita | H04M 1/727 455/410 |
| 2006/0171540 | A1* | 8/2006 | Lee | H04L 9/0822 380/277 |
| 2006/0246892 | A1* | 11/2006 | vonDoenhoff | H04W 28/16 455/427 |
| 2008/0192712 | A1* | 8/2008 | Park | H04L 12/12 370/338 |
| 2009/0043529 | A1* | 2/2009 | Chen | H04L 65/80 702/125 |
| 2010/0128565 | A1* | 5/2010 | Golparian | G01V 1/223 367/79 |
| 2012/0242510 | A1* | 9/2012 | Choi | G01C 21/3688 340/988 |
| 2013/0003757 | A1* | 1/2013 | Boatright | H04N 21/4381 370/474 |
| 2013/0017816 | A1 | 1/2013 | Talty et al. | |
| 2014/0257624 | A1* | 9/2014 | Safa-Bakhsh | G07C 5/0808 701/32.7 |
| 2015/0023395 | A1* | 1/2015 | Tohyama | H04B 1/7156 375/134 |
| 2015/0092642 | A1* | 4/2015 | Geboff | H04L 69/329 370/350 |
| 2016/0142993 | A1* | 5/2016 | Lim | H04N 21/8547 370/503 |
| 2018/0210487 | A1* | 7/2018 | Ohara | G04G 3/00 |
| 2018/0255491 | A1* | 9/2018 | Rabii | H04W 4/023 |
| 2021/0018909 | A1 | 1/2021 | Woo et al. | |
| 2022/0001769 | A1* | 1/2022 | Huh | B60L 58/14 |

FOREIGN PATENT DOCUMENTS

KR 10-2016-0041446 A 4/2016
KR 10-2020-0106594 A 9/2020

OTHER PUBLICATIONS

Supplementary European Search Report dated Jun. 6, 2024 in European Application No. 22753012.8.

* cited by examiner (A)

(B)

(A)

(B)

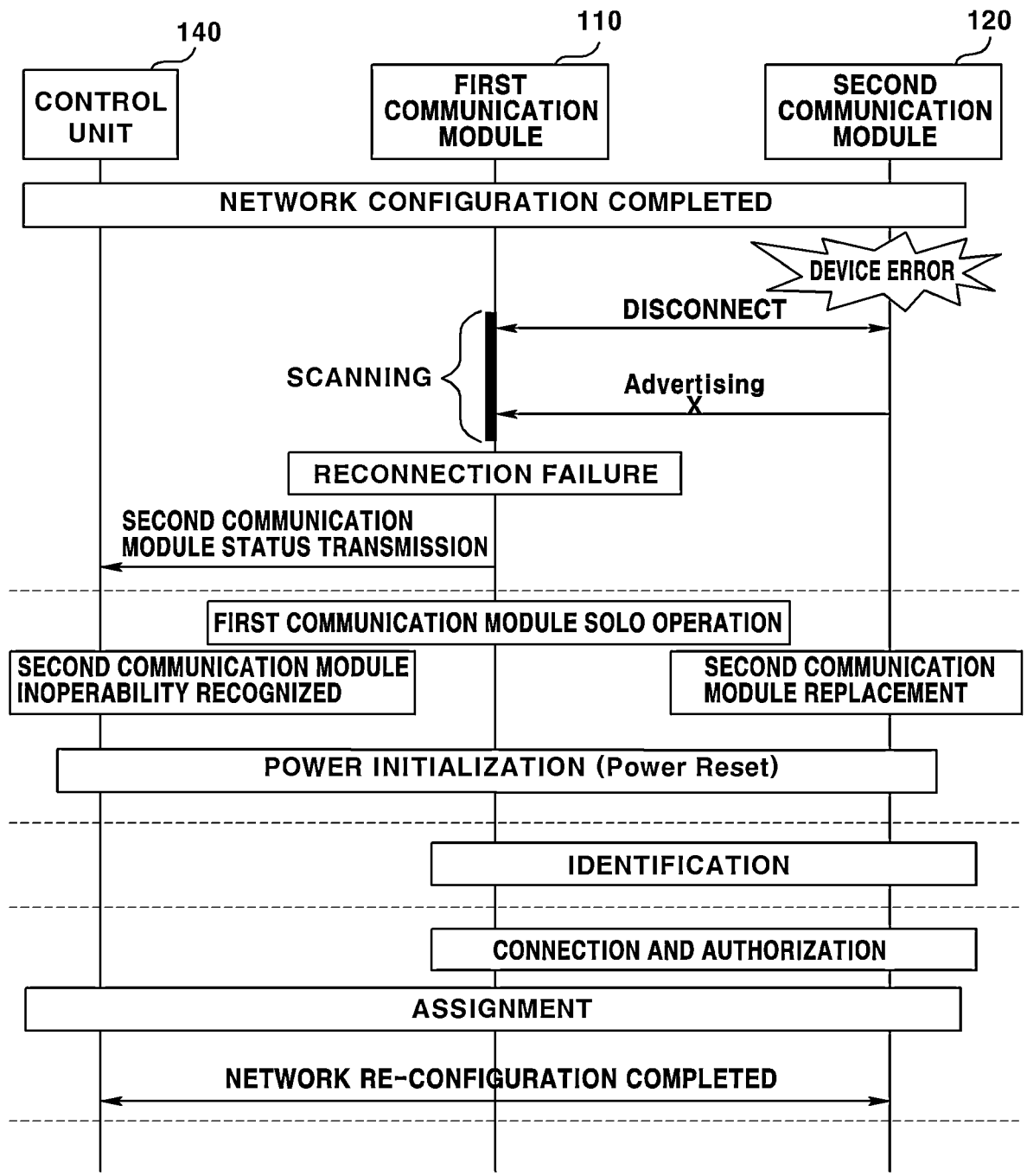

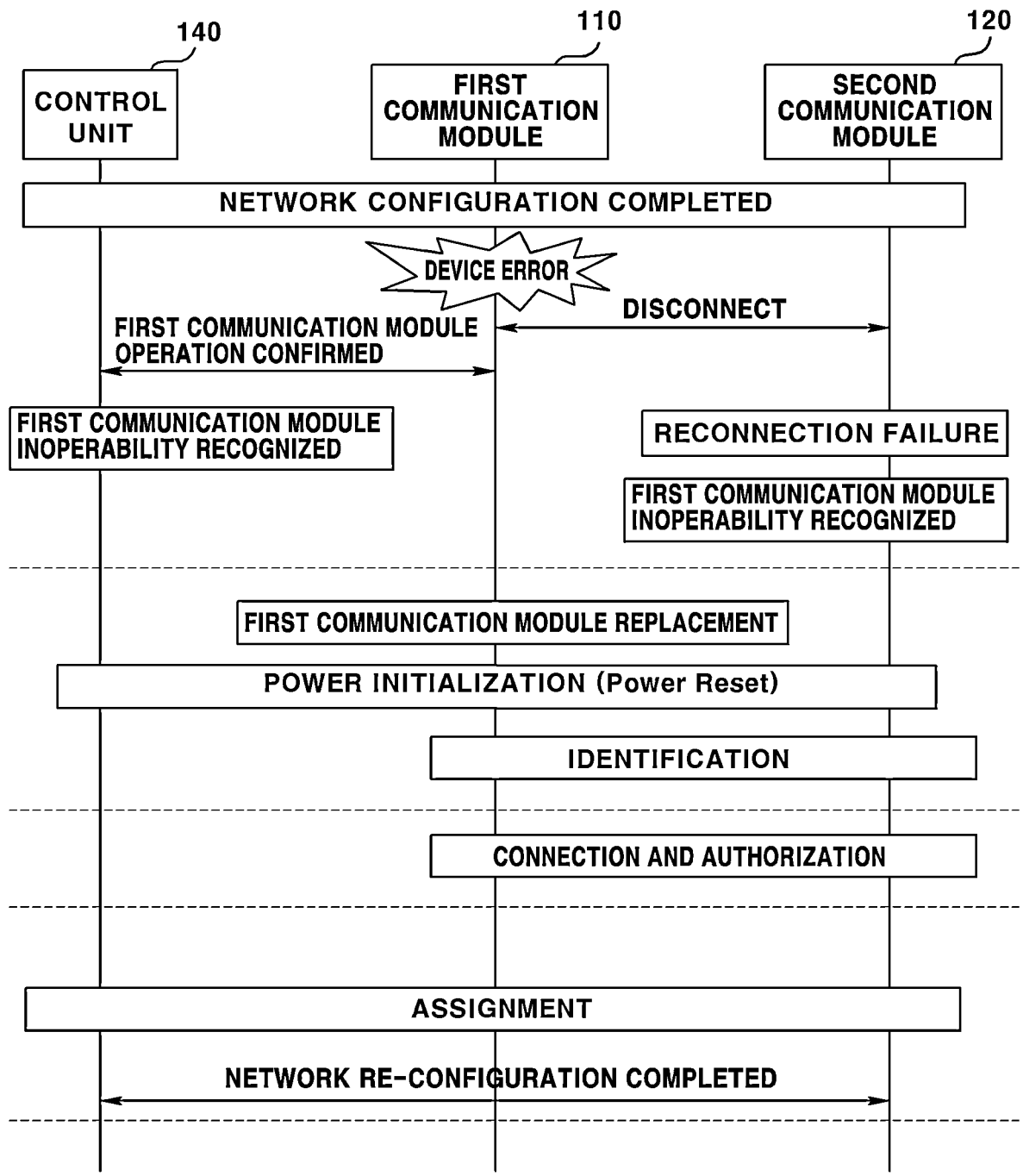

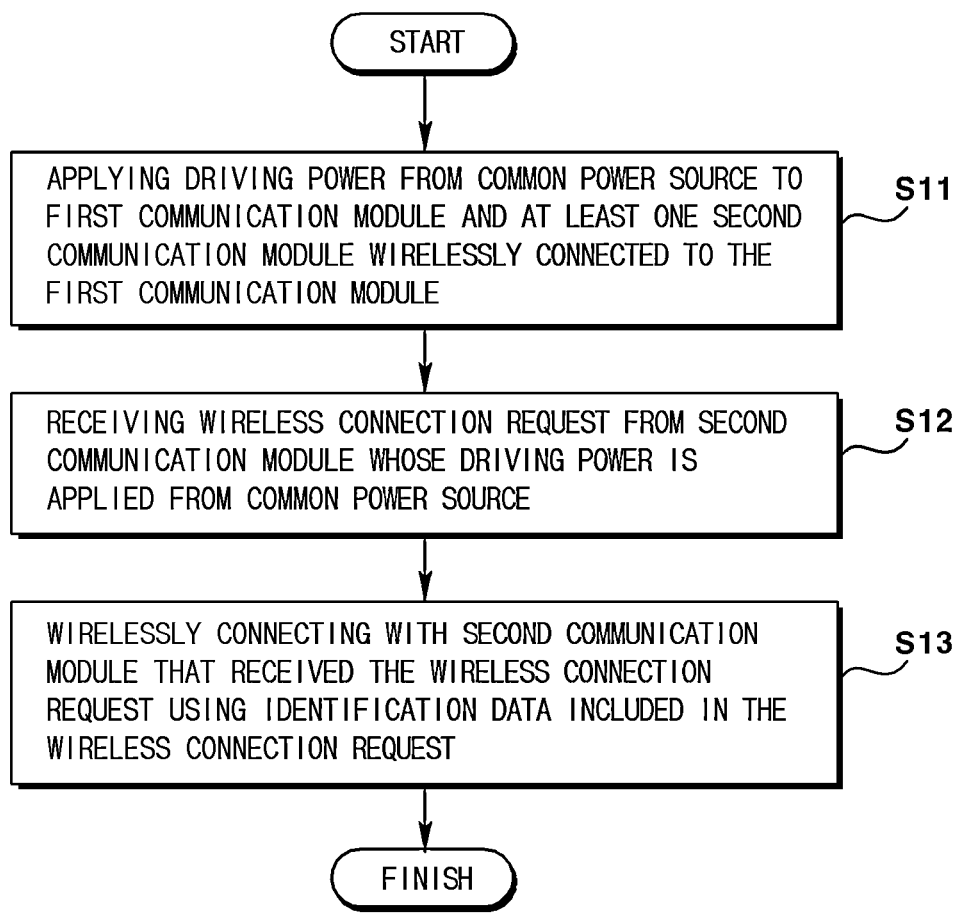

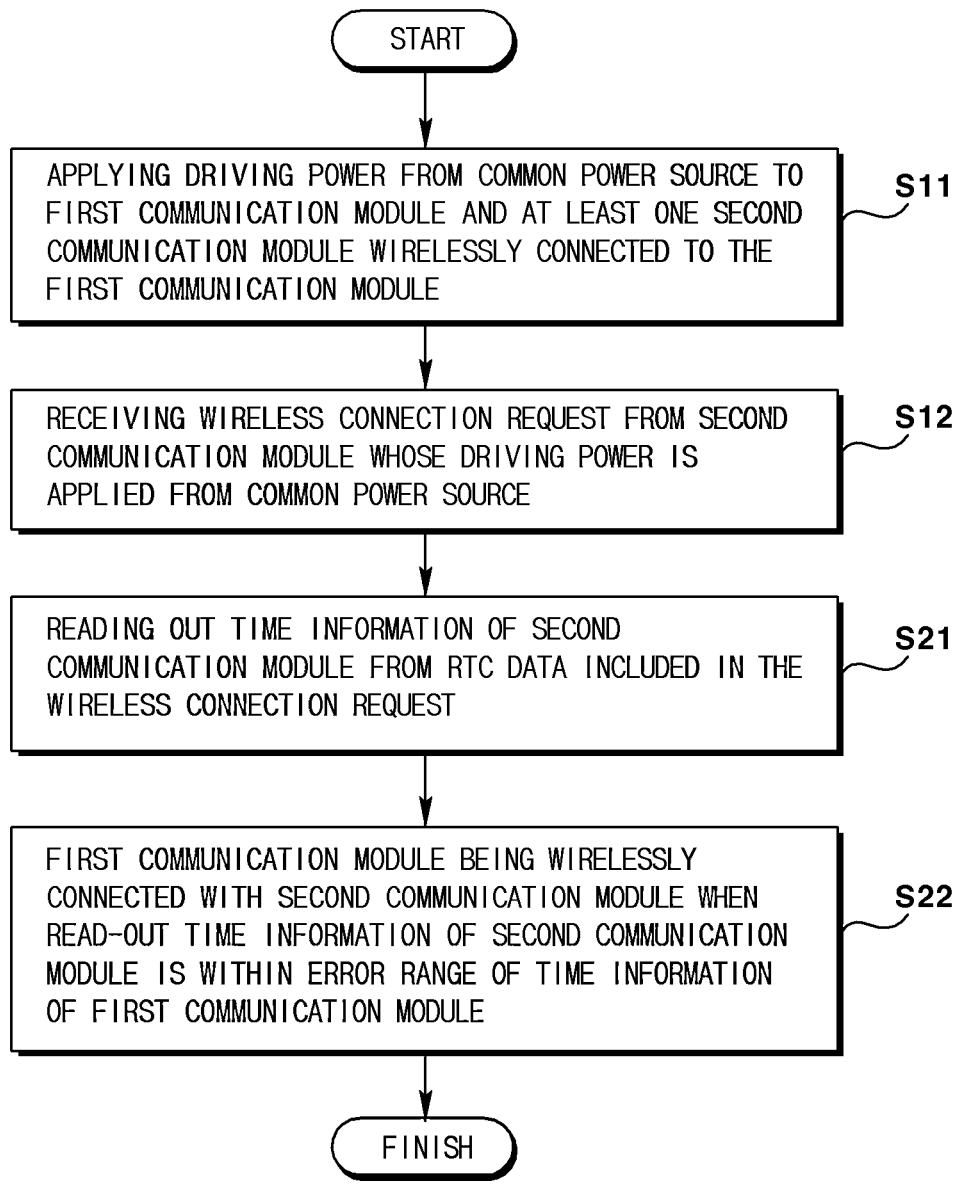

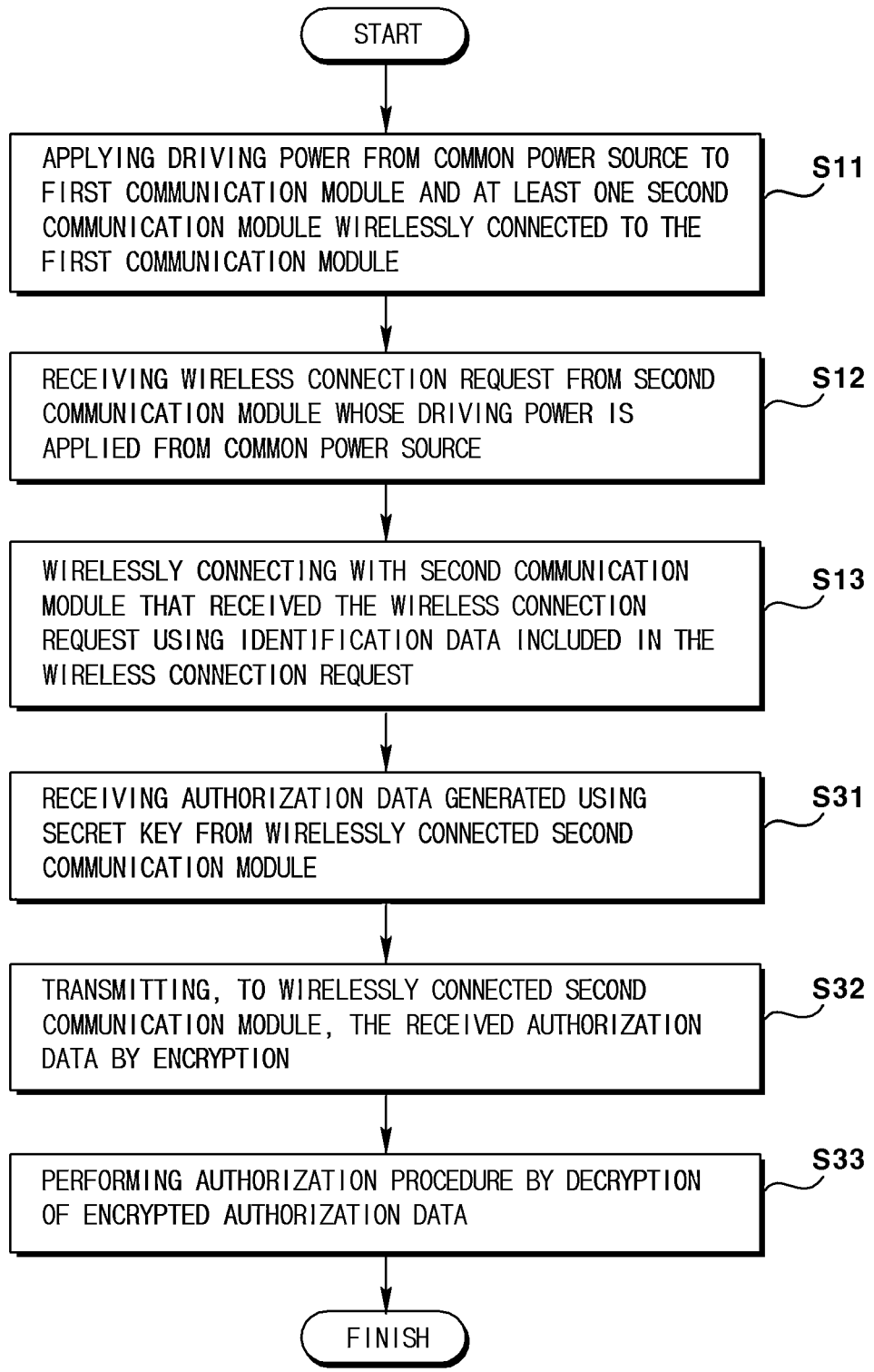

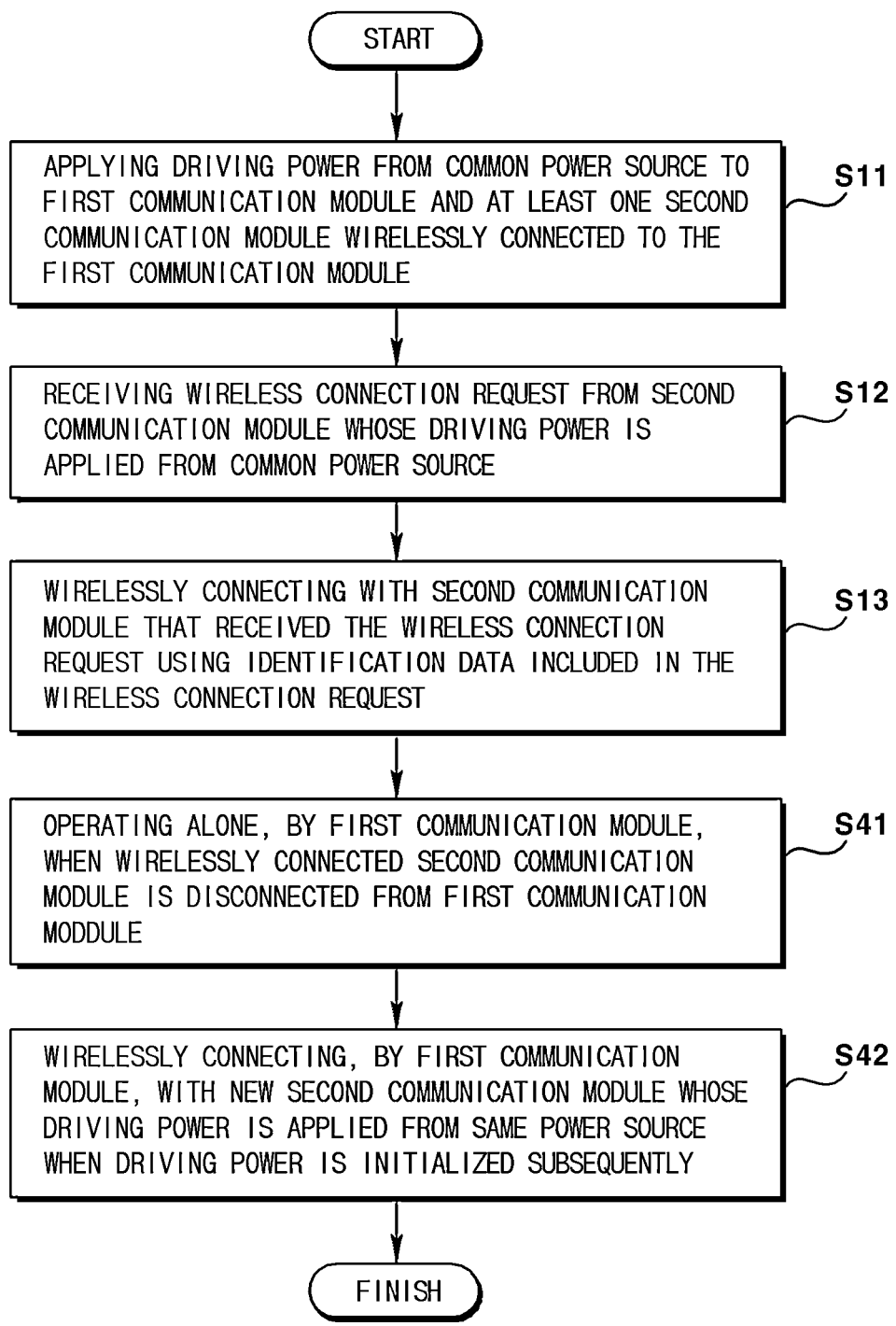

WIRELESS COMMUNICATION SYSTEM

CROSS-REFERENCE TO RELATED APPLICATIONS

This application is the U.S. national stage application of International Patent Application No. PCT/KR2022/002058, filed Feb. 10, 2022, which claims the benefit under 35 U.S.C. § 119 of Korean Application No. 10-2021-0019232, filed Feb. 10, 2021, the disclosures of each of which are incorporated herein by reference in their entirety.

TECHNICAL FIELD

The present invention relates to a wireless communication system, and more particularly to a wireless communication system for organizing a network between a master communication module and a slave communication module using wireless communication, and a method for organizing a wireless communication network.

BACKGROUND OF ART

In a wireless communication module mounted in a vehicle or the like, it is difficult to secure the desired function or range with only one communication module. In order to secure the range of the communication module, the main device (11), which handles the communication, may utilize a plurality of communication modules comprising a master (12) and a plurality of slaves (13), as shown in FIGS. 1(*a*) and 1(*b*). The main unit (11) may be wired to the master (12) and the plurality of slaves (13), respectively, as shown in FIG. 1(*a*), or may be wired to the plurality of slaves (13) via the master (12), as shown in FIG. 1(*b*).

In the case of wired connection, a line connecting each module must be formed, which incurs wiring costs, reduces freedom of design and design according to line arrangement, and limits the location where the slave (13) is mounted.

DETAILED DESCRIPTION OF INVENTION

Technical Subject

The technical problem that the present invention seeks to solve is to provide a wireless communication system and a wireless communication network configuration method for configuring a network between a master communication module and a slave communication module using wireless communication.

Technical Solution

In one general aspect of the present invention, there may be provided a wireless communication system, comprising: a first communication module; and at least one second communication module in wireless connection with the first communication module, wherein the first communication module is in wireless connection with a second communication module whose driving (drive) power is applied from the same power source.

Preferably, the first communication module and the second communication module may be wirelessly connected using identification data including rtc (real time clock) data generated by being simultaneously applied with the driving power.

Preferably, the first communication module may be wirelessly connected to a second communication module whose time information read out from the RTC data is within an error margin of its own time information.

Preferably, the identification data may include a reception signal strength data.

Preferably, the first communication module may include a control unit in wired connection with the first communication module to control communication of the wireless communication system, wherein the first communication module may transmit, to the control unit, a network configuration formed with the wirelessly connected and authenticated to the second communication module, and transmit, to the control unit, data received from the second communication module forming the same network.

Preferably, the first communication module may be a master communication module, and the second communication module may be a slave communication module.

Preferably, the first communication module may perform the authentication procedure, after being wirelessly connected with the second communication module, by receiving authentication data generated using the secret key from the wirelessly connected second communication module, encrypting the received authentication data and transmitting same to the wirelessly connected second communication module, and decrypting the encrypted authentication data from the wirelessly connected second communication module.

Preferably, the first communication module may operate alone when disconnected from the second communication module with which it was wirelessly connected to form a network, but may subsequently be wirelessly connected to a new second communication module having a driving power source from the same power source when the driving power source is initialized.

In another general aspect of the present invention, there is provided a wireless communication network configuration method, comprising: applying a driving power source from a common power source to a first communication module and at least one second communication module in wireless communication with the first communication module; receiving, by a first communication module, a wireless connection request from the second communication module whose driving power source is applied from the same power source; and wirelessly connecting, by the first communication module, with the second communication module that has received the wireless connection request using identification data included in the wireless connection request.

Preferably, the identification data may include real time clock (rtc) data generated by simultaneously applying the driving power source.

Preferably, the wirelessly connecting step may comprise: reading out, by the first communication module, time information of the second communication module from the rtc data; and wirelessly connecting, by the first communication module, with the second communication module when the read time information of the second communication module is within an error margin of time information of the first communication module.

Preferably, the method may further comprise: receiving, by the first communication module, authentication data generated using the secret key from the wirelessly connected second communication module; transmitting, by the first communication module, to the wirelessly connected second communication module, the received authentication data by encrypting same; and performing an authentication procedure, by the wirelessly connected second communication module, the encrypted authentication data by decrypting the encrypted authentication data.

Preferably, the method may further comprise: the first communication module operating alone when the wirelessly connected second communication module is disconnected from the first communication module; and the first communication module wirelessly connecting with a new second communication module having driving power from the same power source when the driving power source is subsequently initialized.

Advantageous Effects of the Invention

According to exemplary embodiments of the present invention, it is possible to perform mutual identification and data communication through wireless connections without wired connection between modules that are paired and perform wireless communication, thereby eliminating wiredness between master-slave modules, thereby reducing cost and complexity, and instead increasing freedom of module placement and design.

In addition, in the recovery procedure in the event of a specific module failure, assignment between modules is automatically performed after power supply, eliminating the need for additional processes and work procedures, and if a specific module is inoperable, immediate status transmission is made to be possible, and quick network reconstruction and recovery are made to be possible during replacement of modules. Furthermore, even if the assigned slave communication module is inoperable, back-up is possible through performance of a certain portion of functions alone by the master communication module or another slave communication module.

BRIEF DESCRIPTIONS OF DRAWINGS

FIGS. 1(a) and 1(b) are block diagrams of a wireless communication system according to a comparative example of the present invention.

FIGS. 3 to 8 are views for explaining a communication system according to an exemplary embodiment of the present invention.

FIG. 9 is a flow chart of a wireless communication network configuration method according to an exemplary embodiment of the present invention.

FIGS. 10, 11 and 12 are flow charts of a wireless communication network configuration method according to an exemplary embodiment of the present invention.

BEST MODE

Hereinafter, exemplary embodiments of the present invention will be described in detail with reference to the accompanying drawings.

However, the present invention is not limited to the specific embodiments described, but may be implemented in a variety of different forms, and one or more of its components may be optionally combined or substituted between embodiments within the scope of the present invention.

In addition, terms (including technical and scientific terms) used in the embodiments of the present invention, unless expressly specifically defined and described, may be construed to have a meaning that would be generally understood by a person of ordinary skill in the art to which the present invention belongs, and commonly used terms, such as dictionary-defined terms, may be interpreted in light of their contextual meaning in the relevant art.

Furthermore, the terminology used in embodiments of the present invention is intended to describe the embodiments and is not intended to limit the present invention. In this specification, the singular form may include the plural form unless the context otherwise requires, and references to "at least one (or more) of a and (or) b and c" may include one or more of any combination of a, b, and c that may be combined.

Furthermore, in describing components of embodiments of the present invention, terms such as first, second, a, b, (a), (b), and the like may be used. Such terms are intended only to distinguish one component from another and are not intended to limit the nature of the components or their sequence or order by the given terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

Figure 1A:
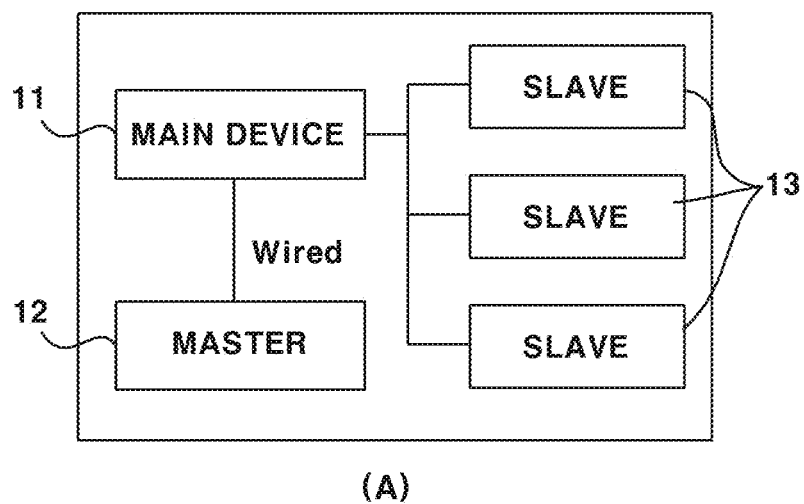
Figure 1B:
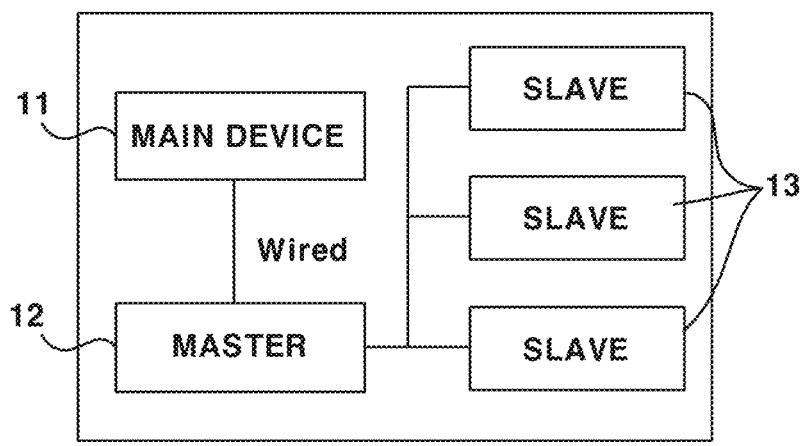
Figure 2:
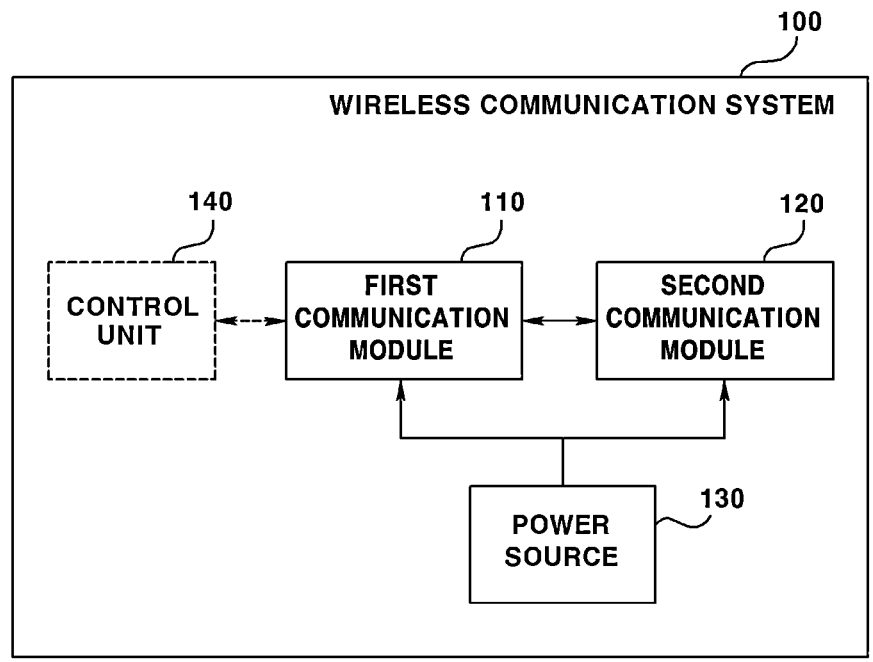
FIG. 2 is a block diagram of a wireless communication system according to an exemplary embodiment of the present invention.

FIG. 2 is a block diagram of a wireless communication system according to an exemplary embodiment of the present invention.

The wireless communication system (100) according to an exemplary embodiment of the present invention may comprise a first communication module (110), a second communication module (120), and may include a power unit (130) and a control unit (140). The communication modules according to an exemplary embodiment of the present invention may be wireless communication modules such as rf modules, nec modules, Bluetooth modules, wifi modules, and the like, and may be mounted on a vehicle or a mobile terminal, but are not limited thereto, and any communication modules that are wirelessly connected to each other are applicable.

Figure 3:
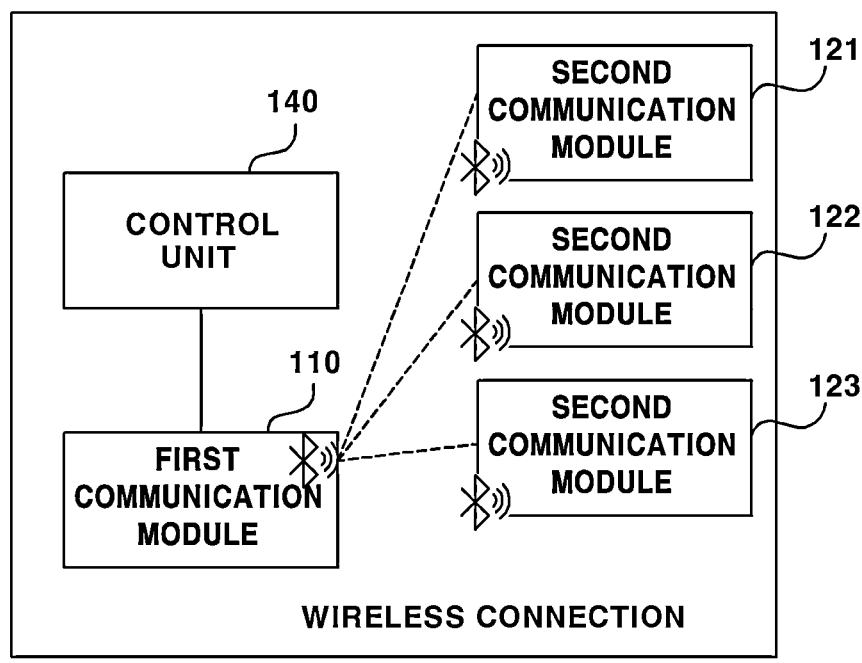

The wireless communication system (100) may include a first communication module (110) and at least one second communication module (120) in wireless connection with the first communication module (110). The first communication module (110) and the second communication module (120) may be in one-to-one wireless connection, or one first communication module (110) and a plurality of second communication modules (121 to 123) may be in one-to-many wireless connection, as shown in FIG. 3. Alternatively, the plurality of first communication modules (110) and the plurality of second communication modules (120) may be wirelessly connected many-to-many to form a wireless communication network. In addition, various other forms of wireless communication networks may be organized.

The first communication module (110) may be a master communication module, and the second communication module (120) may be a slave communication module. Here, the master communication module refers to a communication module that is directly connected to the control unit (140) that controls the communication of the wireless communication system, and the slave communication module refers to a communication module that is indirectly connected to the control unit (140) through the master communication module. Depending on the configuration of the wireless communication network, the first communication module (110) may be configured as a slave communication module and the second communication module (120) may be configured as a master communication module.

Figure 4A:
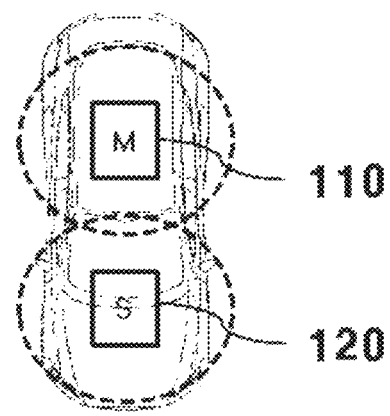
Figure 4B:
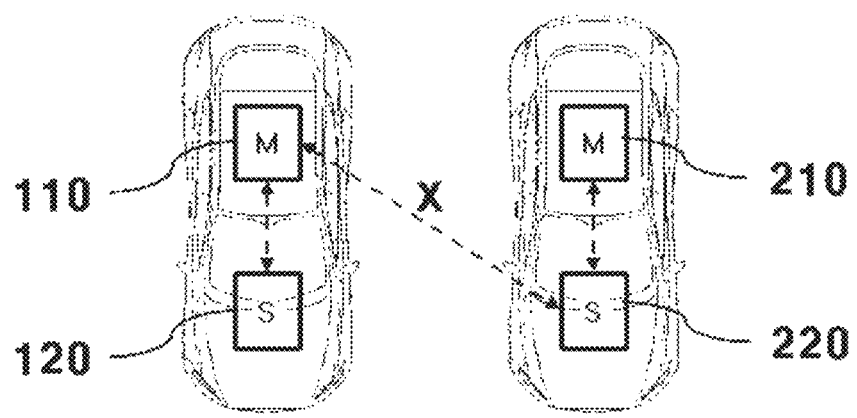

When the first communication module (110) and the second communication module (120) operate in conjunction with each other, a network should be configured to recognize that the first communication module (110) and the second communication module (120) are a pair through wireless communication between the first communication module (110) and the second communication module (120). As shown in FIG. 4(a), when the first communication module (110) is a master communication module and the second communication module (120) is a slave communication module, the coverage range of the entire wireless communication system can be extended by interlocking with each other to the entire device to which the wireless communication system is applied, such as a vehicle, according to their respective coverage ranges. For interlocking between the first communication module (110) and the second communication module (120), the pairing recognizing that they are a pair must be made between the communication modules in the same device, and the pairing must not be made with communication modules mounted on different devices, as shown in FIG. 4(b).

If the first communication module (110) and the second communication module (120) are wired, the pairing process is not required, but if they are wirelessly connected, the pairing process is required. Pairing is initially performed between communication modules, and the paired communication modules store each other's information so that they can subsequently connect wirelessly using the stored information. Alternatively, pairing can be performed for each wireless connection.

The first communication module (110) may be wirelessly connected to the second communication module (120), which receives a drive power from the same power source. The first communication module (110) and the second communication module (120) may be operated by receiving a driving power from a single power source (130). The power source (130) may be an independent power source such as a battery, or a power source connected to a battery or an external power source. The first communication module (110) and the second communication module (120) may be communication modules mounted in the same device, such as a vehicle or a mobile device, and may be operated by receiving a driving power from a power source of the relevant device. The first communication module (110) is wirelessly connected to the second communication module (120) in that the first communication module (110) receives a drive power from the same power source as the second communication module (120). Specifically, the first communication module (110) and the second communication module (120) receive a drive power from the same power source, and when the power is turned on, they are wirelessly connected through mutual identification using simultaneous operation.

The first communication module (110) and the second communication module (120) may be wirelessly connected using identification data including real time clock (RTC) data generated by simultaneously applying the drive power. Each communication module includes an rtc module. The real time clock (rtc) is a device that counts time, and generates an rtc data for data synchronization with other devices. The first communication module (110) and the second communication module (120) are driven by the same power source, and when the drive power is applied, the rtc module included in each communication module is driven. By being driven by the same power source, the rtc modules of each communication module may generate an rtc data within the same range or an rtc data within an error margin. By taking advantage of this, the first communication module (110) and the second communication module (120) can be confirmed to be located in the same device and can be wirelessly connected to each other therethrough. The first communication module (110) may receive identification data including real time clock (RTC) data from the second communication module (120), and may wirelessly communicate with the second communication module (120) such that the time information derived (read) from the rtc data is within an error margin of its own time information.

The identification data for the wireless connection may include received signal strength data. The received signal strength data may be a received signal strength indication (RSSI). RSSI is a received signal strength index, which is an average signal strength index at the receiver input. It is a measure of the strength of all incoming signals to the modules, which in real-world space can be a combination of desired signals, interference signals, and noise signals. Since the first communication module (110) and the second communication module (120) are located in the same device, the strength of the signals transmitted and received from each other may be higher than that of the communication modules located in different devices. Therefore, a wireless connection can be performed by determining whether the value of the received signal strength derived (read-out) from the received signal strength data is above a threshold value. The threshold value may be set by a user, or may be set differently depending on the installation environment.

As previously described, the first communication module (110) is a master communication module, and the first communication module (110) as a master communication module may be directly connected to a control unit (140) that controls the communication of the wireless communication system 100. Here, the control unit (140) is a module that performs wireless communication and may include one or more processors, and may be implemented in the form of a chip. The control part (140) may manage the configuration of the wireless communication network, external devices connected to the communication modules comprising the wireless communication network, and control the wireless communication system to transmit and receive data so that wireless communication is performed.

The control unit (140) may be wired to the first communication module (110) and ma control the communication of the wireless communication system. The first communication module (110) may transmit the network configuration formed with the wirelessly connected and authorized second communication module (120) to the control unit (140), and may transmit data received from the second communication module (120) forming the same network to the control unit (140). The control unit (140) may manage the wireless communication network by receiving a network configuration from the first communication module (110), and may receive and process wireless communication data received by the first communication module (110) or wireless communication data received by the second communication module (120) from the first communication module (110).

The first communication module (110), after being wirelessly connected with the second communication module (120), may perform an authentication procedure by receiving authentication data generated using the secret key from the wirelessly connected second communication module (120), encrypting the received authentication data and transmitting same to the wirelessly connected second communication module (120), and decrypting the encrypted authentication data at the wirelessly connected second communication module (120). After the wireless connection, the first communication module (110) and the second communication module (120) may perform additional authentication for security purposes. After the wireless connection, the second communication module (120) may send authentication data generated using the stored secret key to the first communication module (110) for further authentication. The first communication module (110) may encrypt the received authentication data and transmit same to the second communication module (120), and the second communication module (120) may decrypt the encrypted authentication data and perform authentication by determining whether the secret key of the decrypted authentication data is the same as the secret key used to generate the authentication data. When the wireless connection and authentication are completed, the wireless communication network configuration is completed, the first communication module (110) may transmit the network configuration to the control unit (140), and the configuration of the entire wireless communication network may be assigned to perform the wireless communication.

Figure 5:
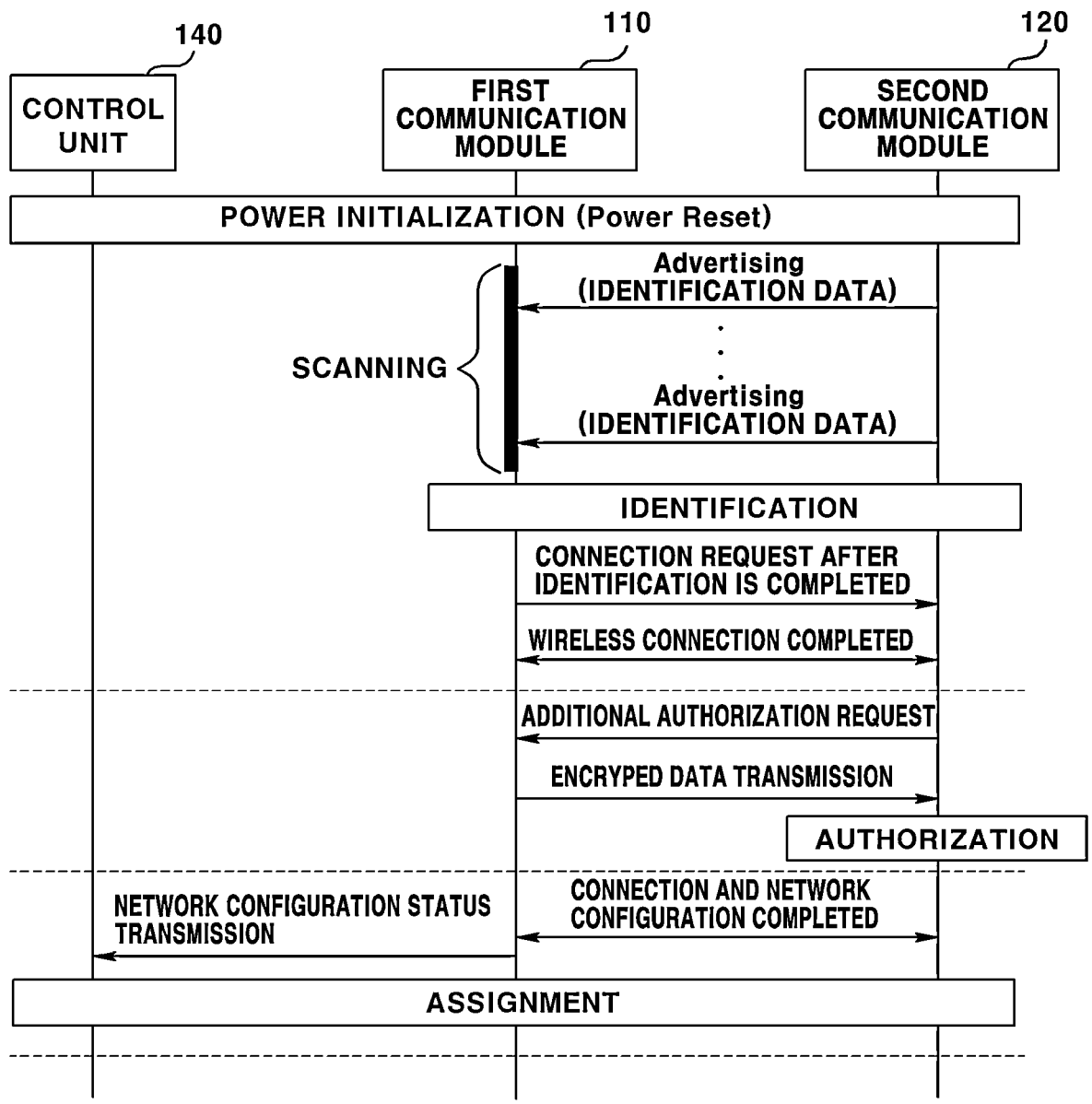

The process of wireless connection, authentication, and assignment may be performed as shown in FIG. 5.

When the power is initialized, drive power is applied to the first communication module (110), the second communication module (120), and the control unit (140) from the same power source to drive them. The first communication module (110) may be a master communication module, and the second communication module (120) may be a slave communication module. The second communication module (120), which is a slave communication module, may transmit an advertising data including identification data, and the first communication module (110), which is a master communication module, may scan the advertising data and identify the second communication module (120) using the identification data included in the advertising data.

The identification data may include rtc data. Since the rtc data has the same value or a value within an error margin in the first communication module (110) and the second communication module (120) due to power initialization, the first communication module (110) may determine whether the time information of the rtc data extracted (read) from the identification data received from the second communication module (120) is within an error margin compared to its own time information, and may perform the identification by determining whether the second communication module (120) is the second communication module to be wirelessly connected. The identification data may further include RSSI data. The first communication module (110) and the second communication module (120) located within the same device may have RSSI data above a threshold value, and the identification process may be performed by determining this. Once the first communication module (110) has identified the second communication module (120), the first communication module (110) may request a connection to the second communication module (120), and a wireless connection may be established between the first communication module (110) and the second communication module (120).

Then, for security purposes, the second communication module (120) may perform additional authorization. After completing the wireless connection, the second communication module (120) may send the authentication data generated by the predefined and stored key to the first communication module (110) for further additional authentication. Here, the secret key to generate the authentication data may be stored in advance by a user, or may be stored when downloading the program. The first communication module (110) may encrypt the authentication data received from the second communication module (120) and transmit it back to the second communication module (120). The second communication module (120) may decrypt the data received from the first communication module (110) to complete the authentication. The second communication module (120) can complete the authentication by determining whether the decrypted secret key is the same as its own secret key.

When the connection and network configuration are completed, the first communication module (110) may update and deliver the network configuration status to the wired control unit (140), and the entire system is assigned to perform wireless communication.

Figure 6:
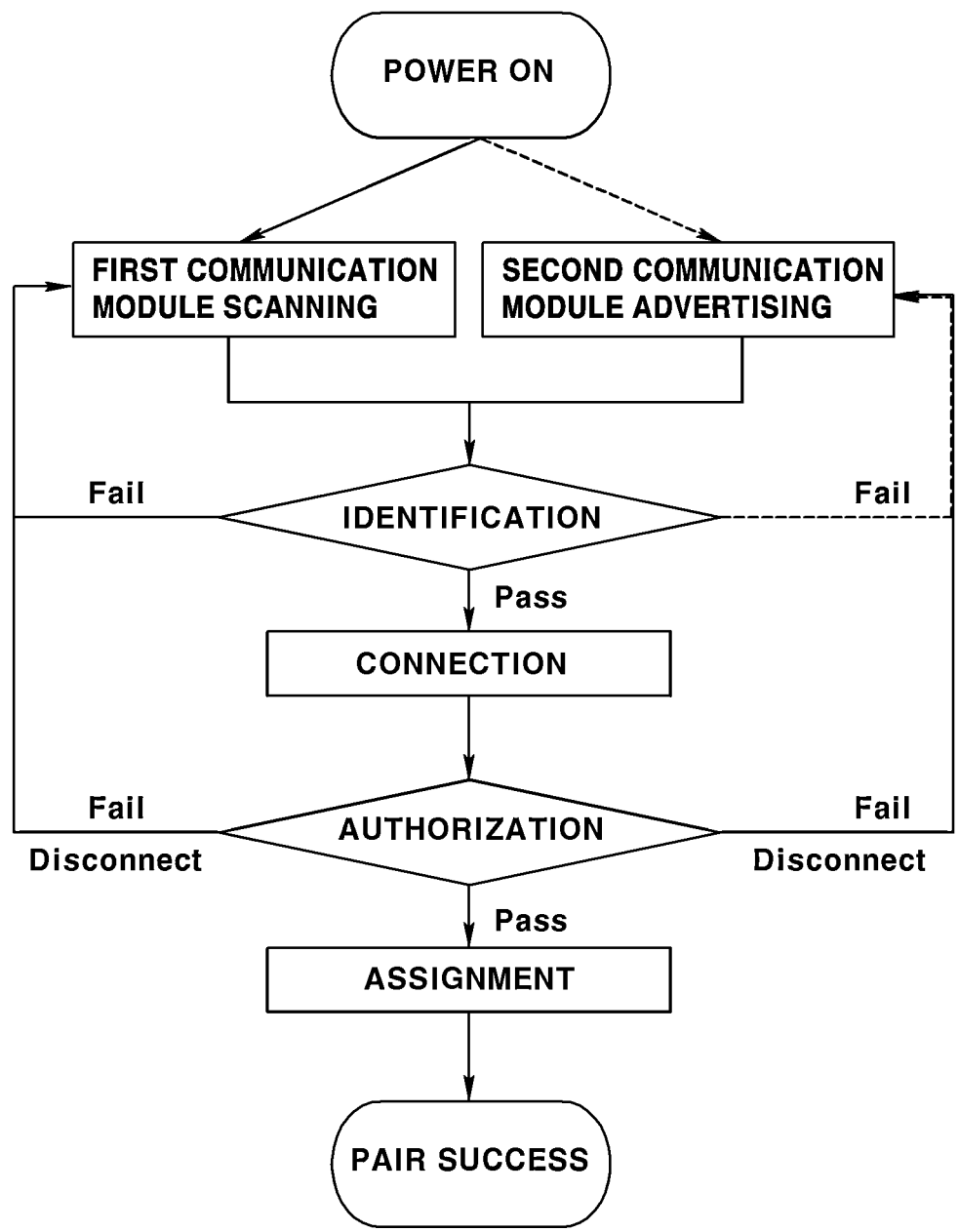

The first communication module (110) and the second communication module (120) may be different communication modules that are not in a relationship of a master communication module and a slave communication module, in which case pairing may be performed as shown in FIG. 6. Each process in FIG. 6 may correspond to a process in FIG. 5. First, power is applied to the first communication module (110) and the second communication module (120) simultaneously. With power applied within the same device, one of the first communication module (110) and the second communication module (120) may perform the advertising, and the other one may perform the scanning to perform the identification to determine whether the second communication module (120) is a useful module within the device. At this point, the RTC data can be used to perform the identification process. When the identification is completed, the mutual wireless connection is established. When identification fails, the advertising and scanning are performed again. After the wireless connection, authorization is performed for security. When the authorization is successful, the IDs of each module are shared and assigned, and the pairing succeeds. When the authorization fails, it may disconnect and perform the advertising and scanning again.

When the first communication module (110) and the second communication module (120) constitute a wireless communication network and a failure or the like occurs in the first communication module (110) or the second communication module (120) during the operation, a process of disconnecting from the failed module, replacing it, and reconnecting wirelessly can be performed again.

The first communication module (110) may operate alone when it is disconnected from the second communication module (120) with which it was wirelessly connected to form a network, but may subsequently be wirelessly connected to a new second communication module (120) that is powered by the same power source when the driving power is initialized. In the event of a malfunction or the like of the second communication module (120) comprising the network, the first communication module (110) may disconnect from the second communication module (120) and operate independently to maintain the wireless communication. Then, when the second communication module (120) is replaced, the process of the wireless connection, authentication, and association with the new second communication module (120) may be performed.

The process of replacing the second communication module (120) and wirelessly connecting to the new second communication module (120) may be performed as shown in FIG. 7.

After the network configuration between the first communication module (110), the second communication module (120), and the control unit (140) is completed, when the second communication module (120) encounters a device failure or the like and is disconnected, no advertising is performed, and the first communication module (110) does not reconnect even if it performs the scanning. When the reconnection fails, the first communication module (110) transmits the disconnection status of the second communication module (120) to the control unit (140). The first communication module (110), which is disconnected from the second communication module (120) in terms of network configuration, operates alone, and the control unit (140) recognizes that the second communication module (120) cannot operate. After replacing the second communication module (120), when the power initialization is performed for reconnecting the second communication module (120), the advertising of the second communication module (120) becomes possible, and identification, connection, and authorization may be performed for assignment, and the network reconfiguration is completed, and wireless communication can be performed. At this time, although not shown in the figure, identification information that was in the first communication module (110) before the power initialization may be initialized.

When a failure or the like occurs in the first communication module (110) rather than the second communication module (120), the process of replacing the first communication module (110) and wirelessly connecting to the new first communication module (110) may be performed as shown in FIG. 8.

After the network configuration between the first communication module (110), the second communication module (120), and the control unit (140) is completed, if a device error or the like occurs in the first communication module (110), the connection is disconnected, the scanning of the first communication module (110) is not performed, and the connection is not reconnected even if the second communication module (120) performs the advertising. When the reconnection fails, the second communication module (120) recognizes that the first communication module (110) cannot operate, and the control unit (140) recognizes that the first communication module (110) cannot operate by checking the operation of the first communication module (110). After replacing the first communication module (110), if a power initialization is performed to reconnect the first communication module (110), the scanning of the first communication module (110) becomes possible, and identification, connection, and authorization can be performed to assign the first communication module (110) to complete the network reconfiguration and perform wireless communication. At this time, although not shown in the figure, the identification information in the first communication module (110) before the power initialization is performed can be initialized.

As described above, it is possible to perform mutual identification and data communication through a wireless connection without a wired connection between modules that are paired and perform wireless communication, thereby eliminating wires between master and slave modules, thereby reducing cost and complexity and increasing freedom of module placement and design. In addition, in the recovery procedure in the event of a specific module failure, interlocking between modules is automatically performed after power supply, eliminating the need for additional processes and work procedures, and if a specific module is inoperable, immediate status transmission is possible, and quick network reconstruction and recovery are possible when replacing the module. Furthermore, even if the interlocked slave communication module is inoperable, the master communication module or another slave communication module can perform a partial backup function by itself.

FIG. 9 is a flow chart of a wireless communication configuration method according to an exemplary embodiment of the present invention, and FIGS. 10 through 12 are flow charts of a wireless communication network configuration method according to another exemplary embodiment of the present invention. The detailed description of each step of FIGS. 9 through 12 corresponds to the detailed description of the wireless communication system of FIGS. 1(a) through 8, and the description will be omitted hereinafter.

To configure (organize) a wireless communication network, in step S11, a driving power is applied from a common power source to a first communication module and at least one second communication module wirelessly connected to the first communication module, in step S12, the first communication module receives a wireless connection request from the second communication module whose driving power is applied from the common power source, and in step S13, the first communication module wirelessly connects with the second communication module that received the wireless connection request using identification data included in the wireless connection request. Here, the identification data may include real time clock (rtc) data generated by simultaneous application of the driving power, and may further include RSSI data.

Step S13 of the wirelessly connection may be performed via steps S21 and S22. In step S21, the first communication module may read out time information of the second communication module from the rtc data, and in step S22, if the read out time information of the second communication module is within an error range of time information of the first communication module, the first communication module may wirelessly connect with the second communication module.

After step S13 of the wirelessly connection, the authentication procedure of steps S31 to S33 may be performed. In step S31, the first communication module may receive authentication data generated using a secret key from the wirelessly connected second communication module, in step S32, the first communication module may encrypt the received authentication data and transmit same to the wirelessly connected second communication module, and in step S33, the wirelessly connected second communication module may decrypt the encrypted authentication data to perform the authentication procedure.

In case a failure or the like occurs in the communication module after the step of S13 of the wireless connection, the wireless communication network can be reconstructed through the steps of S41 and S42. In step S41, the first communication module may operate alone when the wirelessly connected second communication module is disconnected from the first communication module, and then, when the driving power is initialized, in step S42, the first communication module can wirelessly connect with a new second communication module whose driving power is applied from the same power source.

Meanwhile, exemplary embodiments of the present invention can be implemented as computer-readable code on a computer-readable recording medium. The computer-readable recording medium may include any kind of recording device on which data that can be read by a computer system is stored.

Examples of computer-readable recording media include ROM, RAM, CD-ROM, magnetic tape, floppy disk, optical data storage, and the like. Furthermore, the computer-readable recording media may be distributed across networked computer systems, such that computer-readable code may be stored and executed in a distributed manner. And functional programs, code, and code segments for implementing the present invention may be readily deduced by programmers of ordinary skill in the art to which the present invention belongs.

One of ordinary skill in the art to which the present embodiments relate will understand that variations may be implemented without departing from the essential features of the above-described subject matter. The disclosed methods are therefore to be considered from an illustrative rather than a limiting perspective. The scope of the invention is shown in the patent claims and not in the foregoing description, and all differences within the scope of the claims are to be construed as included in the invention.

The invention claimed is:

1. A wireless communication system comprising:
    a first communication module; and
    at least one second communication module wirelessly connected to the first communication module,
    wherein the first communication module is wirelessly connected to the second communication module to which driving power is applied from a same power source as that of the first communication module,
    wherein the first communication module is wirelessly connected to the second communication module after performing identification based on identification data including real time clock (RTC) data generated by real time clock (RTC) modules of the first and second communication modules, the real time clock data modules being simultaneously applied with the driving power from the same power source, and
    wherein the identification is performed by reading out time information from the real time clock (RTC) data of the second communication module and identifying whether the real time clock (RTC) data is within an error margin of time information of the first communication module.

2. The wireless communication system of claim 1, wherein the identification data comprises reception signal strength data.

3. The wireless communication system of claim 1, wherein the first communication module comprises a control unit operably connected with the first communication module via a wired interface to control communication of the wireless communication system, and
    wherein the first communication module is configured to transmit, to the control unit, configuration of a network formed with the second communication module that is wirelessly connected to and authenticated, and to transmit, to the control unit, data received from the second communication module forming the network.

4. The wireless communication system of claim 1, wherein the first communication module is a master communication module, and the second communication module is a slave communication module.

5. The wireless communication system of claim 1, wherein the first communication module is configured to, after wirelessly connecting with the second communication module, receive authentication data generated based on a secret key from the wirelessly connected second communication module, encrypt the received authentication data, and transmit to the wirelessly connected second communication module, and
    wherein the authentication procedure is performed by decrypting the encrypted authentication data at the wirelessly connected second communication module.

6. The wireless communication system of claim 1, wherein the first communication module operates alone when disconnected from the second communication module with which it is wirelessly connected to form a network, and is wirelessly connected to another communication module having a driving power from the same power source when the driving power source is initialized.

7. A wireless communication network configuration method, comprising:
    applying a driving power from a same power source to a first communication module comprising a first real time clock (RTC) module and at least one second communication module comprising a second real time clock (RTC) module;
    receiving, by the first communication module, a wireless connection request from the second communication module whose driving power is applied from the same power source; and
    wirelessly connecting, by the first communication module, to the second communication module, from which the wireless connection request is received, based on identification data included in the wireless connection request,
    wherein the identification data comprises real time clock (RTC) data generated by the first and second real time clock modules of the first and second communication modules, the real time clock date modules being simultaneously applied the driving power from the same power source, and
    wherein the wirelessly connecting step comprises:
    reading out, by the first communication module, time information from the RTC data of the second communication module; and
    wirelessly connecting, by the first communication module, to the second communication module when the time information of the second communication module read out is within an error margin of time information of the first communication module.

8. The wireless communication system of claim 1, wherein the first communication module and the second communication module are mounted in one device, and
    wherein the same power source is a power source of the device.

9. The wireless communication system of claim 2, wherein the first communication module is wirelessly connected to a second communication module whose value of reception signal strength read out from the reception signal strength data is equal to or greater than a threshold value.

10. The wireless communication network configuration method of claim 7, wherein the identification data comprises a reception signal strength data.

11. The wireless communication network configuration method of claim 10,
    wherein the wirelessly connecting step comprises:
    wirelessly connecting, by the first communication module, to a second communication module whose value of reception signal strength read out from the reception signal strength data is equal to or greater than a threshold value.

12. The wireless communication network configuration method of claim 7, wherein the first communication module is wired-connected via a wired interface to a control unit that controls communication of a wireless communication system, wherein the second communication module communicates indirectly with the control unit through the first communication module forming a same network.

13. The wireless communication network configuration method of claim 7, wherein the first communication module is a master communication module, and the second communication module is a slave communication module.

14. The wireless communication network configuration method of claim 7, comprising:

receiving, by the first communication module, authentication data generated based on a secret key from the wirelessly connected second communication module; and encrypting, by the first communication module, the received authentication data and transmitting them to the wirelessly connected second communication module.

15. The wireless communication network configuration method of claim 14, comprising:

performing an authentication procedure, by the wirelessly connected second communication module, by decrypting the encrypted authentication data.

16. The wireless communication network configuration method of claim 7, comprising:

operating alone, by the first communication module, when the first communication module is disconnected from the wirelessly connected second communication module; and wirelessly connecting, by the first communication module, to another communication module having driving power from the same power source when the driving power source is subsequently initialized.

* * * * *